(12) United States Patent
Oishi et al.

(10) Patent No.: US 11,787,253 B2
(45) Date of Patent: Oct. 17, 2023

(54) TRANSPARENT LIGHT UP AIR TANK FOR HOLDING COMPRESSIBLE FLUIDS

(71) Applicant: Universal Air, Inc., San Bernardino, CA (US)

(72) Inventors: Yuzuru Oishi, Apple Valley, CA (US); Daniel Ratcliff, Brea, CA (US)

(73) Assignee: Universal Air, Inc., San Bernardino, CA (US)

( * ) Notice: Subject to any disclaimer, the term of this patent is extended or adjusted under 35 U.S.C. 154(b) by 347 days.

(21) Appl. No.: 17/334,376

(22) Filed: May 28, 2021

(65) Prior Publication Data

US 2022/0266644 A1 Aug. 25, 2022

Related U.S. Application Data

(60) Provisional application No. 63/153,306, filed on Feb. 24, 2021.

(51) Int. Cl.
| | |
|---|---|
| *B60G 11/30* | (2006.01) |
| *F21V 31/00* | (2006.01) |
| *B60G 11/27* | (2006.01) |
| *F16J 12/00* | (2006.01) |
| *F21Y 115/10* | (2016.01) |

(52) U.S. Cl.
CPC ............. *B60G 11/30* (2013.01); *B60G 11/27* (2013.01); *F16J 12/00* (2013.01); *F21V 31/005* (2013.01); *F21Y 2115/10* (2016.08)

(58) Field of Classification Search
CPC .......... B60G 11/30; B60G 11/27; F16J 12/00; F21V 31/005; F21Y 2115/10
See application file for complete search history.

(56) References Cited

U.S. PATENT DOCUMENTS

| 8,905,071 | B2 | 12/2014 | Coombs | |
|---|---|---|---|---|
| 2012/0056389 | A1* | 3/2012 | Leclerc | B60G 17/0526 280/5.507 |
| 2013/0207355 | A1* | 8/2013 | Pavuk | B60G 11/27 280/124.157 |
| 2017/0166026 | A1* | 6/2017 | Landgraf | B60L 50/72 |

* cited by examiner

*Primary Examiner* — Mary Ellen Bowman
(74) *Attorney, Agent, or Firm* — KOS IP Law LLP

(57) ABSTRACT

A fluid tank for storing a compressible fluid may have a translucent wall is disclosed. A light emitting diode (LED) may be configured to illuminate the wall. The fluid tank may comprise a tube and two end caps. The tube may be coupled to the end caps. Connecting rods disposed in the tube may be coupled to the end caps to squeeze the end caps onto the opposed ends of the tube. The LED may be disposed between one of the end portions of the tube and the end cap attached to that end portion of the tube. When the LED is illuminated, light is projected into the tube so that the tank now has a color to it.

14 Claims, 9 Drawing Sheets

TRANSPARENT LIGHT UP AIR TANK FOR HOLDING COMPRESSIBLE FLUIDS

CROSS-REFERENCE TO RELATED APPLICATIONS

This application claims the benefits of U.S. Ser. No. 63/153,306, filed on 2021 Feb. 24, the entire contents of which is expressly incorporated herein by reference.

FEDERALLY SPONSORED RESEARCH OR DEVELOPMENT

Not Applicable

BACKGROUND

Air compression systems are useful to provide compressed air to air springs to raise or lower a vehicle. An air compressor may be used to fill an air tank with pressurized air. When needed, the air tank may be used to deliver pressurized air to various devices, such as to fill an air spring to raise a vehicle, to fill a car tire, to drive an impact wrench, or to supply air to horns.

Thus, there is a need in the art for an improved air tank.

SUMMARY

A system and method for building and using a transparent tank for holding compressed air is disclosed. The tank may have a transparent tube and a colored light source that illuminates the transparent tube so that the air tank may be aesthetically pleasing to someone looking at the air tank. The transparent tube may be disposed between two end caps that form fluid-tight seals with the transparent tube. The end caps may be directly coupled to one another using one or more connecting rods internally disposed within the transparent tube to form an airtight seal between the end caps and the end portions of the tube.

The wall of the tank (i.e., the tube) may have a portion that is transparent in a manner that allows light to pass through the wall from one side of the wall to another. Although the tube is described as being transparent, it is also contemplated that the tube may be translucent and opaque. As used herein, a translucent material includes a transparent material. The tank may be configured to hold any gaseous material, such as air, nitrogen, etc., and may be configured to hold the gaseous material in a compressed state. When a fluid coupling, such as a pipe or a tube, is coupled to a port opening of the tank, the fluid coupling may be used to expel the compressed fluid to a distal device, such as the gas springs of a vehicle, a car tire pressurization device, an impact wrench, or an air horn. The wall of the tank may comprise a translucent tube disposed between two end caps. The end caps may cover the openings of the translucent tube using fluid-tight seals to hold fluid within the cavity of the tank.

The translucent tube may comprise a cylinder having a circle-shaped end. By way of example and not limitation, the ends of the tube may have other shapes, such as an ellipse or oval, that may be covered by end caps configured to cover the ends of the tube. Each of the end caps may have a groove configured to accept an end of the translucent tube. The groove may be similarly circle-shaped to mate with the translucent tube. One or more seals may be placed within one or both of the grooves to help to form the fluid tight seal between the end cap and the translucent tube. Contemplated seals include o-rings, x-rings, and lip seals. Seals, such as o-rings, may be configured to seal opposing sides of an end of the tube where the tube forms a seal with an end cap. For example, a smaller seal may be disposed between the groove in an end cap and an inner wall of the translucent tube, and a larger seal may be disposed between the groove in the end cap and an outer wall of the translucent tube.

The tank may have a light source comprising one or more light-emitting diodes disposed and configured to illuminate a portion of the translucent tube and/or a portion of the interior cavity of the translucent tube. A power supply may be connected to the light-emitting diode to provide power to the light-emitting diode. The power supply may be connected to the light-emitting diode via a power cable threaded through an end cap. One or more light-emitting diodes may be configured to direct the light through the translucent tube from one side of the translucent tube to the other side of the translucent tube, for example, through one end of the translucent tube to the other, opposite end of the translucent tube. One or more light-emitting diodes may be disposed between the translucent tube and an end cap. Such a light-emitting diode may be shaped to fit within the groove that mates with the end of the translucent tube, allowing the light from the light-emitting diode to direct light towards an end of the translucent tube. A light-emitting diode may be disposed between each end cap and an end of the translucent tube, configured to direct light towards the translucent tube, which may illuminate the translucent tube from both ends of the tube.

One or more connecting rods may be coupled to the first and second end caps to help hold the end caps in place with respect to the translucent tube. The connecting rods may be disposed to be internal to the translucent tube. Similar to the elastic seals of the end caps, one or more elastic seals may be used to form a fluid-tight seal between an end of the connecting rod and an end cap. The connecting rods may be coupled to the end cap using any suitable connection means, for example, threaded connectors such as screws or bolts.

Each end cap may have one or more ports configured to allow fluid to pass through the end cap into or out of the tank. For example, one end cap may comprise one or more input ports that may be configured to accept a fluid into the tank cavity, while the other end cap may comprise one or more output ports that may be configured to expel a pressurized fluid out of the tank cavity, or an end cap may comprise both input ports and output ports. An end cap may have a plurality of output ports that may be each configured to allow the tank to expel pressurized fluid to distinct devices separate from one another. A gasket may be coupled to an end cap having one or more ports that may be in fluid connection with one or more ports of the end cap to assist in routing fluid that enters or exits the port of the end cap. The gasket may have one or more one-way valves in fluid connection with a port of the end cap to ensure that the fluid flows only one way in or out of the port.

The fluid tank may be assembled in any suitable manner. For example, a method of assembly may dispose the translucent tube between two end caps and then form airtight seals between each end cap and the translucent tube to form an airtight fluid tank. An airtight seal may be formed using elastic seals disposed between an end cap and the translucent tube. For example, an elastic seal may be placed between a groove in an end cap and the inner wall of an end of the translucent tube, while another elastic seal may be placed between the groove in the end cap and the outer wall of the end of the translucent tube.

The end caps may be coupled to one another using one or more connecting rods. The connecting rods may connect the end caps together through the interior cavity of the translucent tube, and threaded connectors may be used to tighten an end of the connecting rod with an end cap. For example, a first threaded connector may be threaded through a first end cap to an end of a connecting rod, while a second threaded connector may be threaded through the second end cap to the opposing end of the connecting rod. Tightening the threaded connectors may then pull the end caps towards one another, helping to form the airtight seal while minimizing pressure applied directly to the translucent tube during tightening. The airtight seal in the end cap may be maintained by disposing an elastic seal between a threaded connector and an end cap.

An end cap may be configured to pass fluid through a port formed in the end cap by coupling a manifold to the end cap. For example, an input manifold may be coupled to an end cap to receive a fluid that fills the tank, while an output manifold may be coupled to an end cap to expel a pressurized fluid from the tank to a device. Preferably, the input manifold may be coupled to one end cap, while the output manifold may be coupled to the opposing end cap disposed on an opposite end of the translucent tube. The manifolds and the end caps may be constructed to be identical and fungible to one another, creating a symmetrical tank having manifolds on both ends having both input and output fluid ports fluidly coupled to one-way valves in the manifold.

A light-emitting diode (LED) may be disposed between either or both ends of the translucent tube and the end cap. A light-emitting diode may be placed within a groove formed within the end cap and may be configured to direct light from the diode into or through the wall of the translucent tube. Power may also be provided to the light-emitting diode from a power supply to illuminate the translucent tube. The power may be provided via a power cable threaded through an end cap from the power supply to the light-emitting diode. A controller may be functionally coupled to one or more LEDs to illuminate the tank in any suitable manner, for example by flashing a light pattern or light color specified by the controller transmitting the triggering signal to the LED.

DETAILED DESCRIPTION

Figure 1:
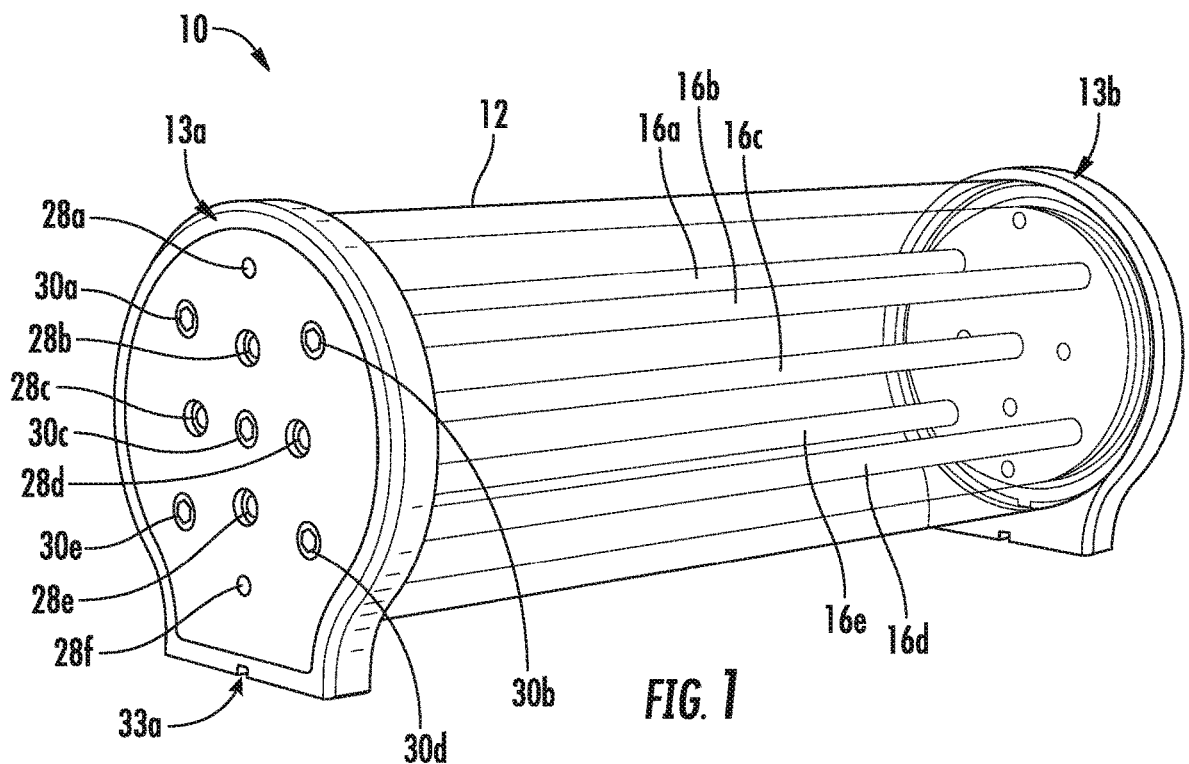
FIG. 1 shows a front perspective view of a translucent tank.

A novel transparent air tank designed to hold pressurized gas is disclosed. FIGS. 1-6 disclose an exemplary transparent tank 10. The transparent tank 10 may be formed by disposing a transparent cylinder 12 between two end caps 13a and 13b that form an airtight seal with the transparent cylinder 12. The transparent tank 10 may be illuminated by a light-emitting diodes (LED) 34a, shown in the exploded view of FIGS. 3 and 4, and LED 34b, shown in FIGS. 5 and 6, so that the tank 10 may be lit up in different colors. The end caps 13a and 13b may be held in place on opposing sides of the transparent tank 10 using the connecting rods 16a-16e and screws 30a-j, shown in the exploded views of FIGS. 3 and 5. Air hoses or pipes, such as those shown in FIG. 12, may be coupled to the end caps 13a or 13b via any of ports 28a-f (see FIG. 1) or ports 28g-1 (see FIG. 2), respectively, to allow fluid to flow into and out of tank 10. For example, in FIG. 12, the fluid couplings 36a and 36b may be used to direct air from the air pumps 70a and 70b, respectively, to the air tank 10 for pressurizing the air tank 10, while the fluid couplings 36c and 36d may be used to direct air from the air tank 10 to the gas springs 38a-d to raise the gas springs 38a-d of a vehicle. The vehicle may be raised by directing air to the gas springs 38a-d from tank 10, such as by opening the valves 39a-d while closing the valves 37a-d. The vehicle may be lowered by releasing air from the gas springs 38a-d, such as by opening the valves 37a-d while closing the valves 39a-d.

An alternative air tank 60 is shown in FIGS. 7-10. The air tank 60 may be configured similarly to the air tank 10, but has a manifold 40a (see FIG. 7), and manifold 40b (see FIGS. 8-10). The manifolds 40a and 40b direct the flow of air through the end caps 13c and 13d, respectively. For example, the flow of air through the ports 28p and 28q (see FIG. 10) of the end cap 13d, may be directed via the ports 42p and 42q of the manifold 40b. As shown in FIG. 11, the air tank 60 may be filled with compressed air from pump 70 via the pipe 65a. The air tank 60 delivers air via the pipes 66a and 66b to inflate the gas springs 38a-d in pairs. Valve 68a may be opened and valve 67a may be closed to raise both of the gas springs 38a and 38b. Conversely, the valve 67a may be opened and the valve 68a may be closed to lower both of the gas springs 38a and 38b. Similarly, valve 68b may be opened while closing valve 67b to raise the gas springs 38c and 38d. Conversely, valve 67b may be opened and valve 68b may be closed to lower the gas springs 38c and 38d. The central gauge may be used to determine a pressure differential between the air springs 38a and 38b verses the air springs 38c and 38d. These systems are described in more detail below.

Referring now to FIGS. 1-6, a tank 10 is shown, which may be configured to be pressurized with a fluid. As used herein, a fluid may be a gas. The fluid may flow into, or out of, tank 10 via one or more ports 28a-f, shown in FIG. 1, or 28g-1, shown in FIG. 2. Such a fluid may be held in tank 10 in a compressed form, which may be then dispensed to one or more distal devices, such as air suspensions, air springs, or tires in a vehicle. For example, where tank 10 may be configured to hold air, compressed air held in tank 10 may be dispensed to raise air springs in a vehicle.

Tank 10 may have a translucent tube 12 (e.g., glass, plastic, such as acrylic), configured to allow at least some light to pass through the tube and allow a user to view the interior of tank 10. While tube 12 is shown here as transparent, tube 12 may be translucent to allow some, but not all, light to pass through, or may be opaque in some areas and translucent or transparent in other areas. A translucent material is one that allows at least some light to pass from one side to another side of the material, whereas a transparent material is one that allows at least 95% of light to pass from one side to another side of the material. As such, a tube 12 referred to as translucent may be transparent or may have portions of which that are transparent. The translucent tube 12 may be opaque with portions of which that are translucent, having translucent windows that allow light to pass through the wall of the tube from one side of the window to another side of the window. Tube 12 may comprise a prismatic material that reflects or refracts light directed towards the tube from a light-emitting diode (LED), such as the LED 34a shown in FIG. 3, or the LED 34b shown in FIG. 5. Tube 12 may comprise a mixture of any of transparent and/or translucent material with an opaque material, such as a glass substrate having opaque or translucent flakes that reflect or refract light from a light source to other parts of the tank 10. Tube 12 may comprise a transparent glass having a translucent decal coupled to a surface of the glass, which allows the decal to be illuminated by an LED, such as LEDs 34a and 34b, when the LED is activated. Any portion of tube 12 may be colored to allow only certain colors to pass through the translucent material of tube 12. For example, a portion of tube 12 may have a red hue, a blue hue, or a yellow hue.

The material of the translucent tube 12 may be configured to hold a compressible fluid within the walls of translucent tube 12 without shattering, cracking, or permanently deforming the volume of the translucent tube 12. For example, the material of the translucent tube 12 may be made of a material that withstands at least 40, 80, 100, 200, 1000 PSI. Tank 10 may be configured to hold a volume of at least 1, 3, or 5 gallons of compressed fluid, which may flow into, or out of, of any of the ports 28a-1 shown in FIGS. 1 and 2. For example, an air pump may be fluidly coupled to the ports 28a-f of the end cap 13a to deliver compressed air to the cavity of tank 10, while gas springs may be fluidly coupled to the ports 28g-1 of the end cap 13b to deliver compressed air from the cavity of the tank 10 to the gas springs. A fluid coupling may comprise any suitable mechanism used to deliver fluid to or from the tank, such as a pipe, hose, or tube.

Figure 3:
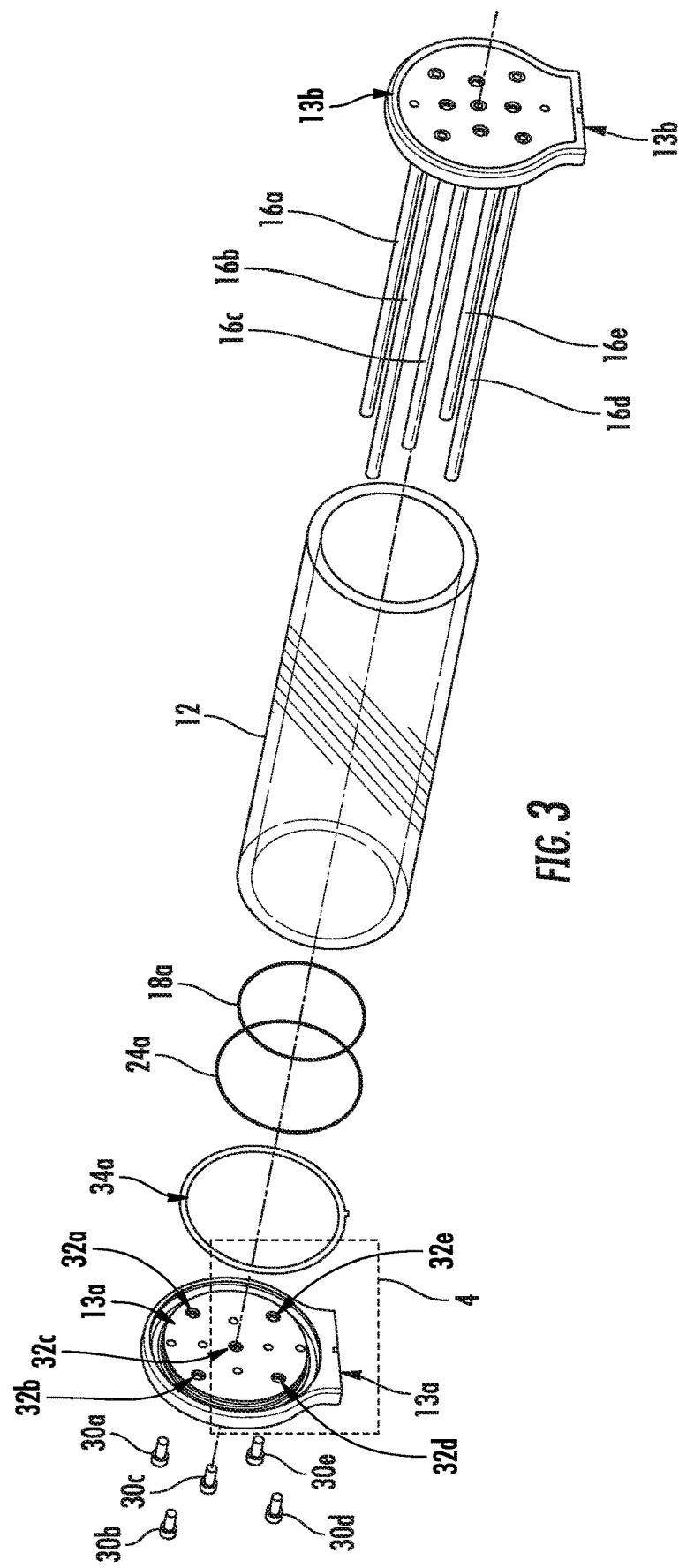
FIG. 3 shows an exploded, perspective view of the translucent tank of FIG. 1.

While tube 12 is shown in FIG. 3 is a cylinder having symmetrical, circular ends, tube 12 may be shaped in any suitable manner, for example, by having an oval-shaped or rectangular-shaped cross-section and/or ends. Any hollow three-dimensional shape may be used in lieu of tube 12, such as a rectangular or hexagonal prism in lieu of a cylindrical prism, although symmetrical shapes may advantageously distribute forces compared to than non-symmetrical shapes. Preferably, the hollow three-dimensional shape has a hollow core and open ends that allow a user to easily maintain and clean the interior of tube 12 when either of the end caps 13a and 13b are removed from tube 12.

Figure 2:
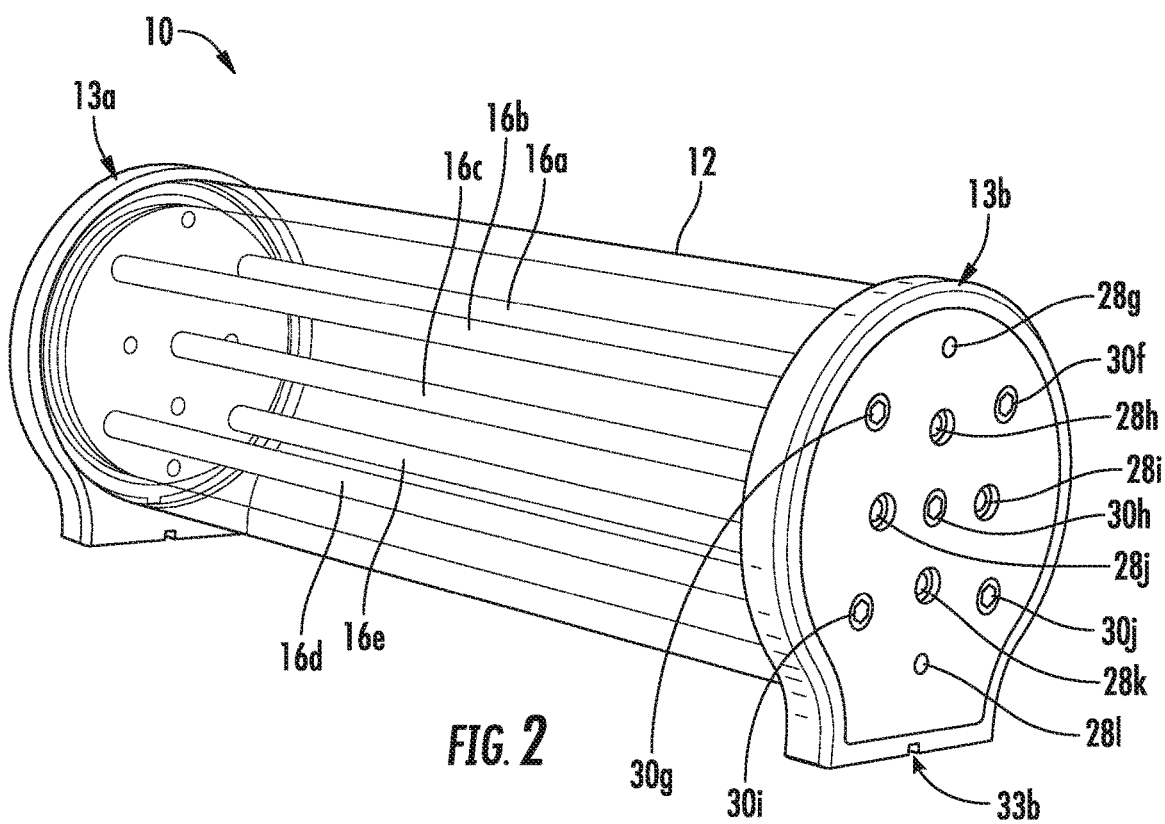
FIG. 2 shows another front, perspective view of the translucent tank of FIG. 1.
Figure 5:
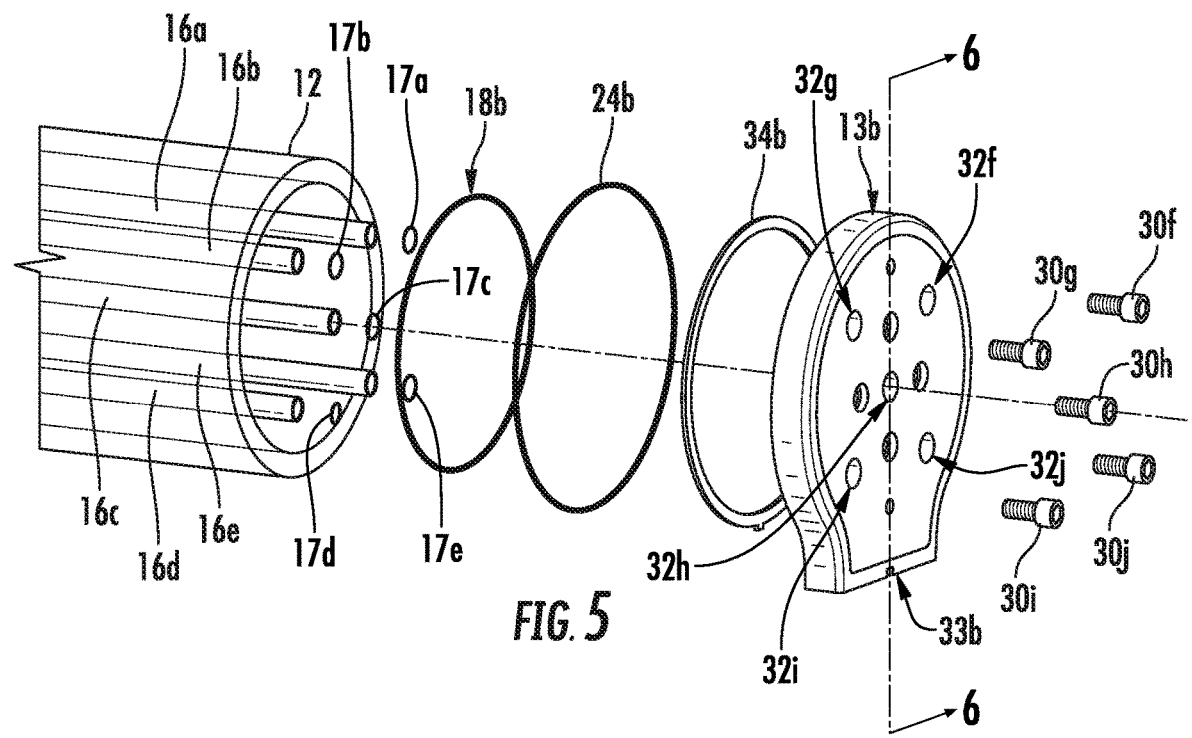
FIG. 5 shows another exploded perspective view of the translucent tank of FIG. 1.
Figure 6:
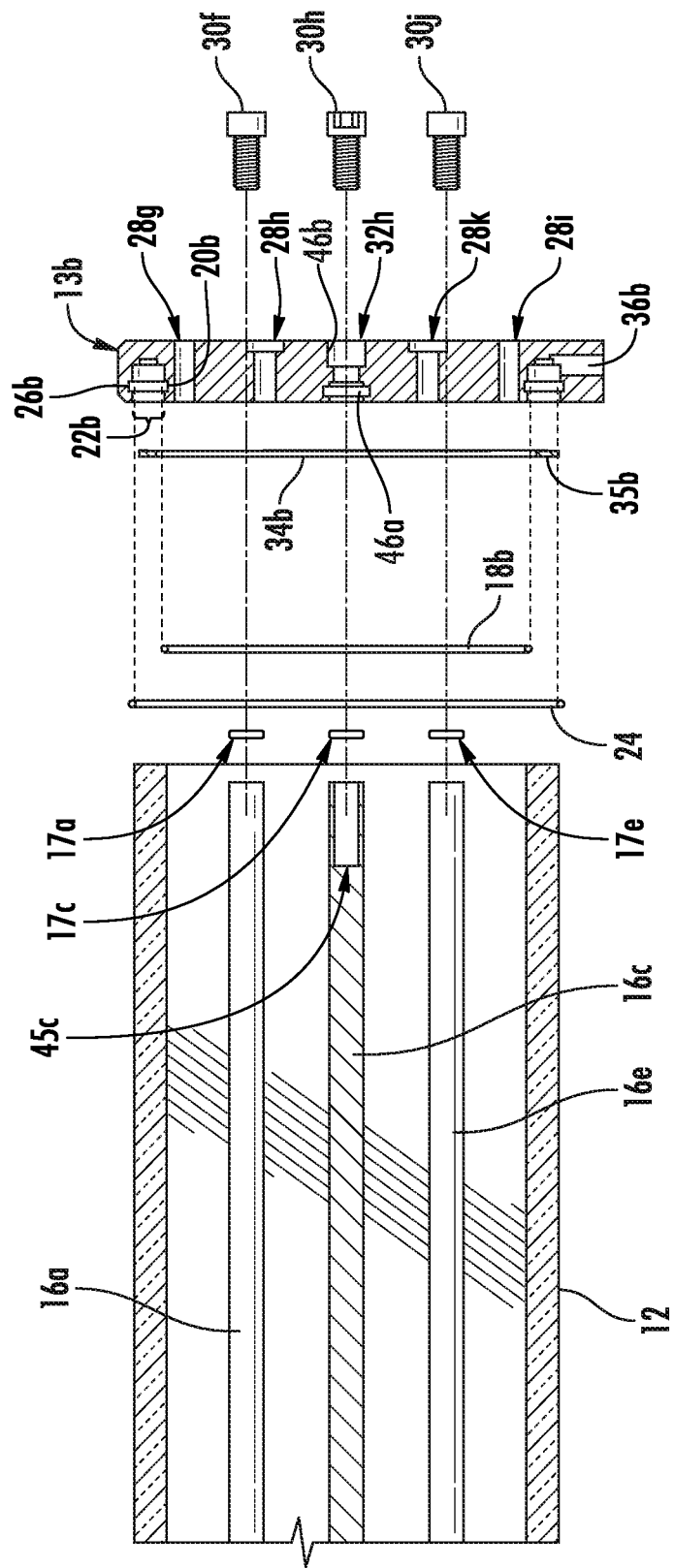
FIG. 6 shows a cross-sectional view of the translucent tank of FIG. 5 along line 6 of FIG. 5.
Figure 7:
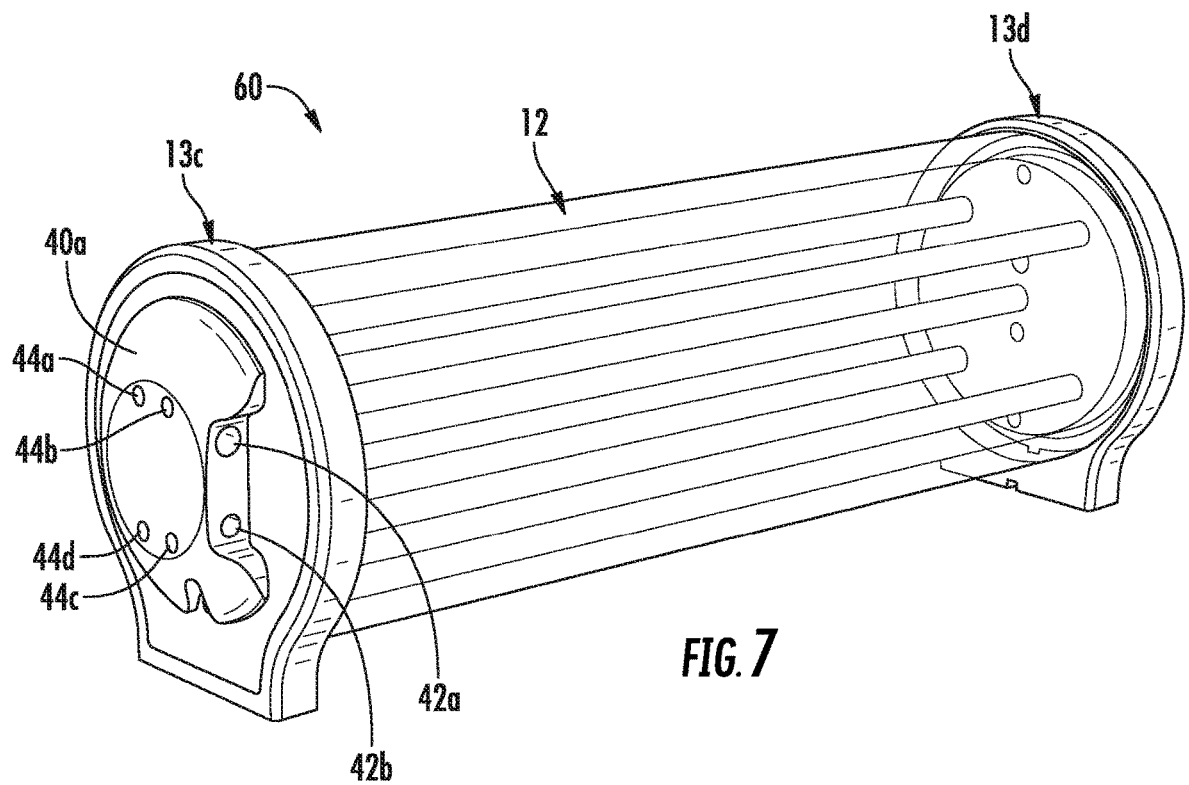
FIG. 7 shows a perspective view of an alternative translucent tank.
Figure 8:
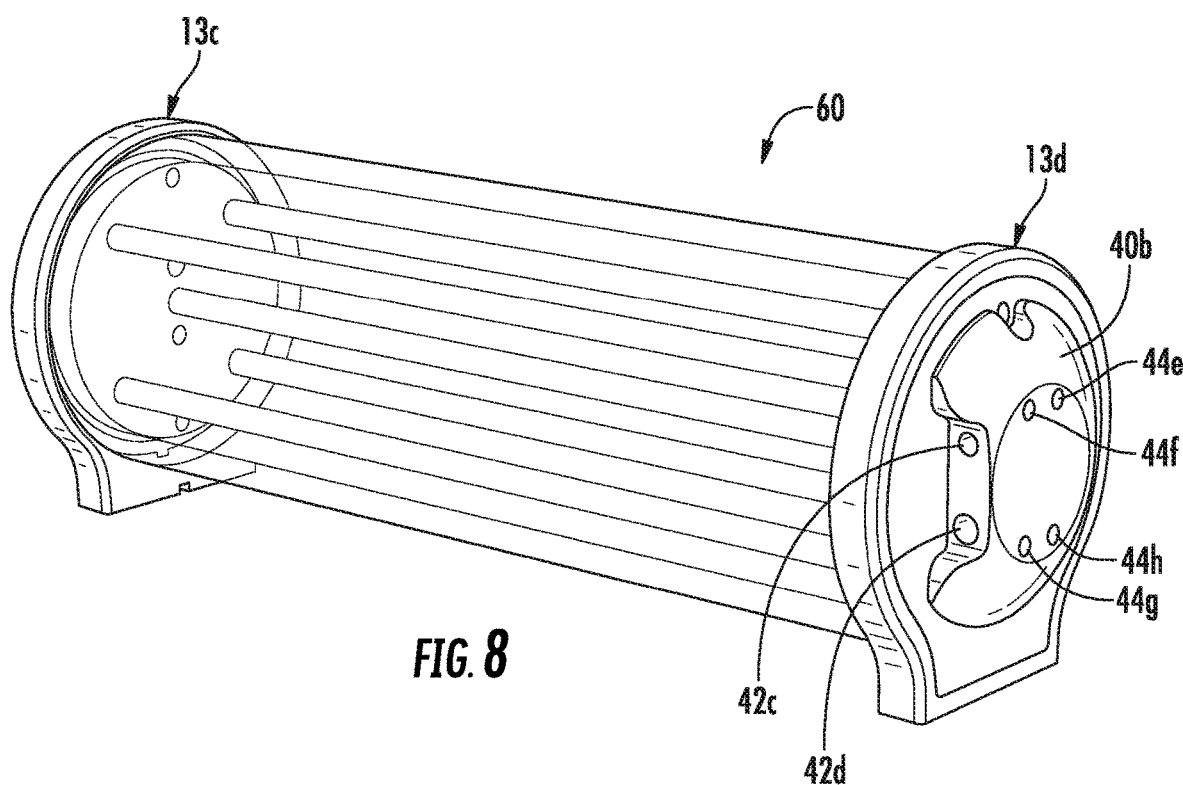
FIG. 8 shows an alternative perspective view of the translucent tank of FIG. 7.

The end caps 13a and 13b may be disposed on both ends of tube 12 to seal the open ends of tube 12 with a fluid-tight seal. The end caps 13a and 13b may be held in place with respect to tube 12 using the rods 16a-16e, which may be disposed internal to tube 12 when coupled to each of the end caps 13a and 13b, as shown in FIGS. 1-2. As shown in FIG. 3, the rods 16a-e may be held to the end cap 13a with the screws 30a-e. Specifically, the screws 30a-e may thread through the screw holes 32a-e, respectively, of the end cap 13a, to tighten the rods 16a-e, respectively, to the end cap 13a. Likewise, as is shown in FIG. 5, the rods 16a-e may be held to the end cap 13b with the screws 30f-j. Similarly, the screws 30f-30j may thread through the screw holes 32f-j, respectively, of the end cap 13b, to tighten the rods 16a-e, respectively, to the end cap 13b. Each of the rods 16a-16e may have a threaded cavity sized and disposed to accept a screw, such as the threaded hole 45c of rod 16c shown in FIG. 6. Using such threaded connections allows a user to easily loosen or tighten a connector, such as the screw 30h, depending on need. It should be understood that, since the cross-sectional area of the line 6 in FIG. 5 does not run through the screw holes 32g, 32f, 32i, and 32j or the rods 16a, 16b, 16c, and 16e of FIG. 5, the cross-sectional areas of the other screw holes and rods are not shown in FIG. 6, but may be configured to be similar to the screw hole 32h and the rod 16c shown in FIG. 6, respectively. As shown in FIG. 6, the screw 30h may thread through both the screw hole 32h and the seal 17c before entering the threaded cavity 45c of the rod 16c to secure both the rod 16c and the seal 17c to the end cap 13b. The screws 30a-e (see FIG. 3) may also be used to couple and tighten the rods 16a-e, respectively, to the end cap 13a via similar threaded connections. Connectors other than the screws 30a-j may be used to hold the rods 16a-e in place relative to the end caps 13a, 13b while maintaining the fluid-tight connection between the end caps 13a, 13b and the tube 12, such as clasps, snap connectors, and elastically matching indents/detents.

The end surfaces of the rods 16a-e may be configured to be fluid-tight with the end caps 13a and 13b in any suitable manner. For example, the seals 17a-e (see FIGS. 5 and 6), may also be disposed between the rods 16a-e and the end caps 13a and 13b, which may fill in gaps between the rod and the end cap in an air-tight manner to help form a fluid-tight seal. As shown in FIGS. 5 and 6, a screw hole 32h may have a groove 33a to accept the seal 17c, similar to the groove 26b for the seal 24, and the screw hole 32h may have a groove 33b to accept the head of the screw 30h to be flush or recessed from the surface of the end cap 13b. The seal 17c may be used help to form a fluid-tight seal between the rod 16c and the end cap 13b, and/or may help to guide the rod 16c into the appropriate place within the screw hole 32h. Any suitable seal may be used, for example an o-ring, an x-ring, or a lip seal.

The end caps 13a and 13b may also be sealed to the inner surface of tube 12 with one or more seals, such as the inner seal 18a shown in FIG. 3 and the inner seal 18b shown in FIG. 5. One end of the tube 12 may be disposed to fit within the center groove 22a of end cap 13a shown in FIG. 4. The inner seal 18a (see FIG. 3) may be disposed to fit within the inner groove 20a (see FIG. 4). The outer seal 24a (see FIG. 3) may be disposed to fit within the outer groove 26a (see FIG. 4). The inner seal 18a may form a fluid-tight seal between the tube 12 and the end cap 13a when the screws 30a-e are threaded through the screw holes 32a-e, respectively, to couple to the rods 16a-e, respectively. The inner seal 18a and the outer seal 24a may also provide stability to the end of the tube 12 as a user inserts the end of tube 12 into the center groove 22a of the end cap 13a.

Similarly, the other end of the tube 12 may be disposed to fit within the center groove 22b of end cap 13b shown in FIGS. 5 and 6. The inner seal 18b (see FIGS. 5 and 6) may be disposed to fit within the inner groove 20b (see FIG. 6). The outer seal 24b (see FIGS. 5 and 6) may be disposed to fit within the outer groove 26b (see FIG. 6). The inner seal 18b may form a fluid-tight seal between the tube 12 and the end cap 13b when the screws 30f-j (see FIG. 5) are threaded through the screw holes 32*f-j*, respectively, to couple to the rods 16*a-e*, respectively. The inner seal 18*b* and the outer seal 24*b* may also provide stability to the other end of the tube 12 as a user inserts the end of tube 12 into the center groove 22*b* of the end cap 13*b*. The seals 18*a*, 18*b*, 24*a*, and 24*b* may comprise any suitable elastic material that compresses to help form a fluid-tight seal when compressive forces are placed upon it, such as an elastomer like nitrile, neoprene, EPDM rubber and fluorocarbon. Any suitable seals could be used, such as o-rings, x-rings, lip seals, or even non ring-shaped seals sized and disposed to match the openings of the tube 12.

The end caps 13*a* and 13*b* may have ports used to allow fluid to flow into, and out of, the cavity of the tube 12. For example, the ports 28*a-f* may be formed in end cap 13*a* and ports 28*g-l* may be formed in end cap 13*b*. The ports may be used to transmit a fluid into or out of tank 10 in any suitable manner. For example, the ports 28*a-f* may be used as input ports to fill tank 10 with gas to pressurize tank 10, while the ports 28*g-l* may be used as output ports to deliver pressurized gas to a device (e.g., a gas shock of a vehicle to lift the vehicle). The valves discussed herein may be one-way valves so that fluid only travels in the proper direction.

While the end caps 13*a* and 13*b* are shown in FIGS. 3 and 5 as each having an identical configuration to one another, the end caps may have varied configurations from one another. For example, the cap 13*a* may comprise a single large fluid port instead of the 5 smaller fluid ports 28*a-f* to allow air to be sent to the fluid tank 10 via a single fluid connector, such as a tube, while the cap 13*b* may comprise 5 smaller fluid ports 28*g-l* that may each be coupled to a distinct distal device, to distribute compressed fluid from the tank 10 to separate devices (not shown). The fluid ports may be shaped to allow different amounts of fluid to flow through the ports, which may distribute the compressed fluid at uneven flow rates. Each of the distal devices may be coupled to a port in separate fluid communication with the other ports to allow fluid to flow from the tank 10 to each of the devices in a discrete manner.

Figure 4:
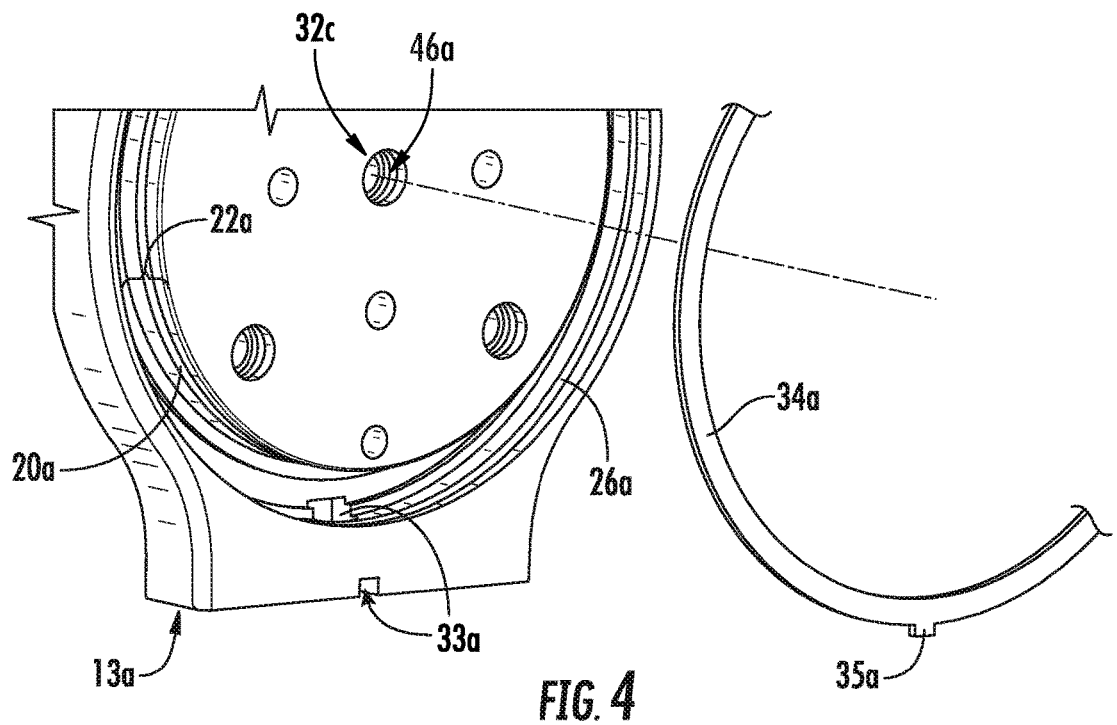
FIG. 4 shows a zoomed-in view of a section of FIG. 3.

Any suitable LED (i.e., light-emitting diode) may be used to illuminate tank 10. In FIGS. 3 and 4, an LED 34*a* is shown disposed in the groove 22*a* of the end cap 13*a*. The LED 34*a* may be disposed between the end of the tube 12 and the end cap 13*a* shown in FIG. 3. The LED 34*a* may have an electrical connector 35*a* that may be coupled to a powered connection (not shown) that may be passed through the power port 36*b*. A second LED 34*b* may also be disposed of in groove 22*b* (see FIGS. 5 and 6) of end cap 13*b*, similarly to LED 34*a*, to allow light to be transmitted via tube 12. The LED 34*b* may be disposed of between the end of tube 12 and the end cap 13*b*. The LED 34*a* may have an electrical connector 35*a* that may be coupled to a powered connection (not shown) that may be passed through the power port 33*a*. Similarly, the LED 34*b* may have an electrical connector 35*b* (see FIG. 6) that may be coupled to a powered connection that may be passed through the power port 33*b*. The LEDs 34*a* and 34*b* may be configured to emanate any color of light, such as white, black, red, blue, or green light. The LED 34*a* may be configured to provide the same color light as the LED 34*b*, allowing for the LEDs to be synchronized to increase the amount of light used to illuminate the tank 10, or may be configured to provide a different color light than the LED 34*b*, such as a red light for the LED 34*a* and a green light for the LED 34*b*, allowing for different combinations of colors to light up the tank 10. Other LEDs may be introduced to tank 10 in other suitable ways, for example, an LED may be coupled to one or more of the connecting rods 16*a-e* to illuminate tube 12 from within. While the LEDs 34*a* and 34*b* are shown here as ring LEDs, the LEDs may be shaped in any suitable manner to illuminate portions of tank 10, such as rectangularly shaped.

Figure 11:
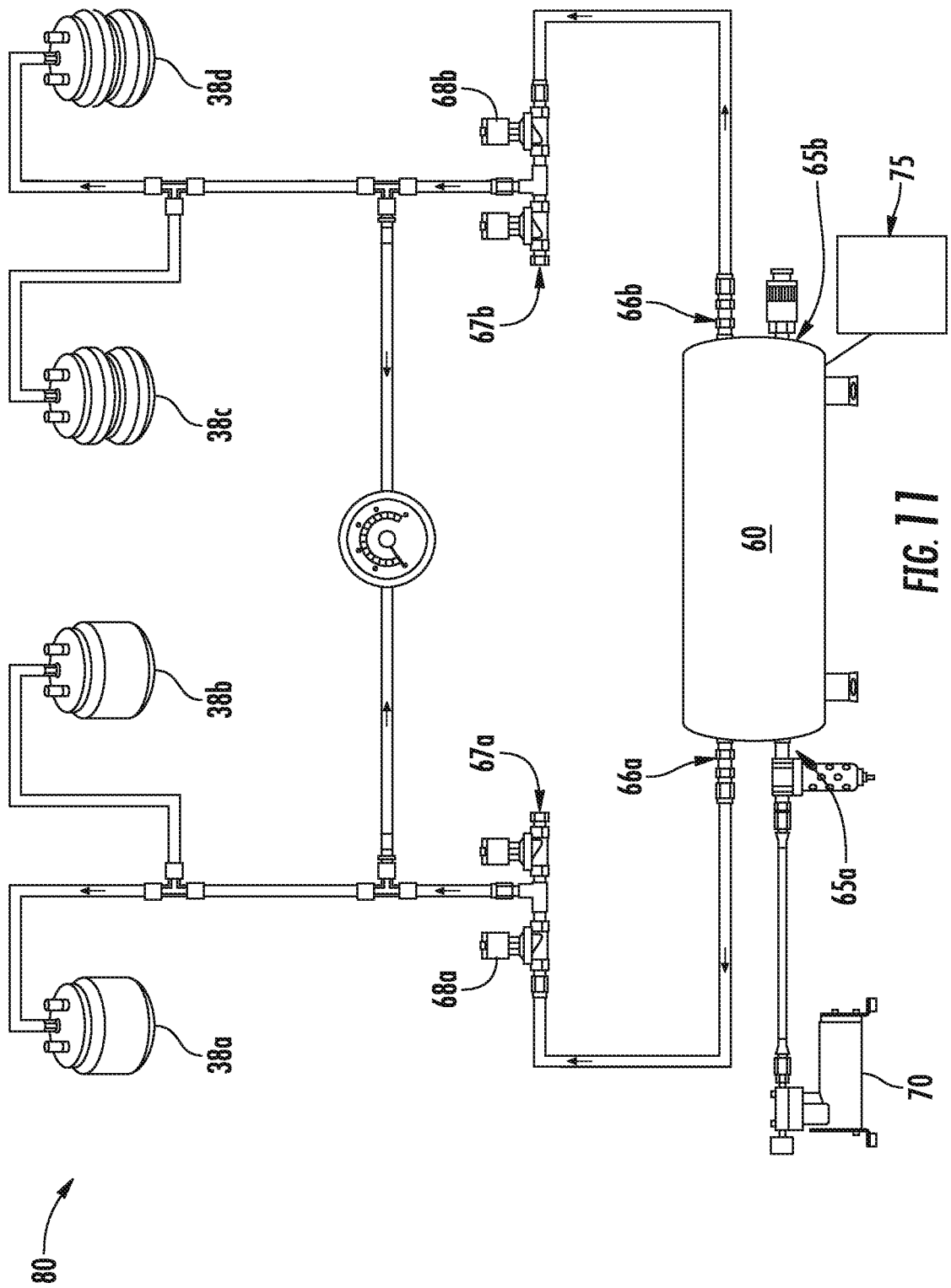
FIG. 11 shows a schematic of an exemplary tank used in an automobile system.
Figure 12:
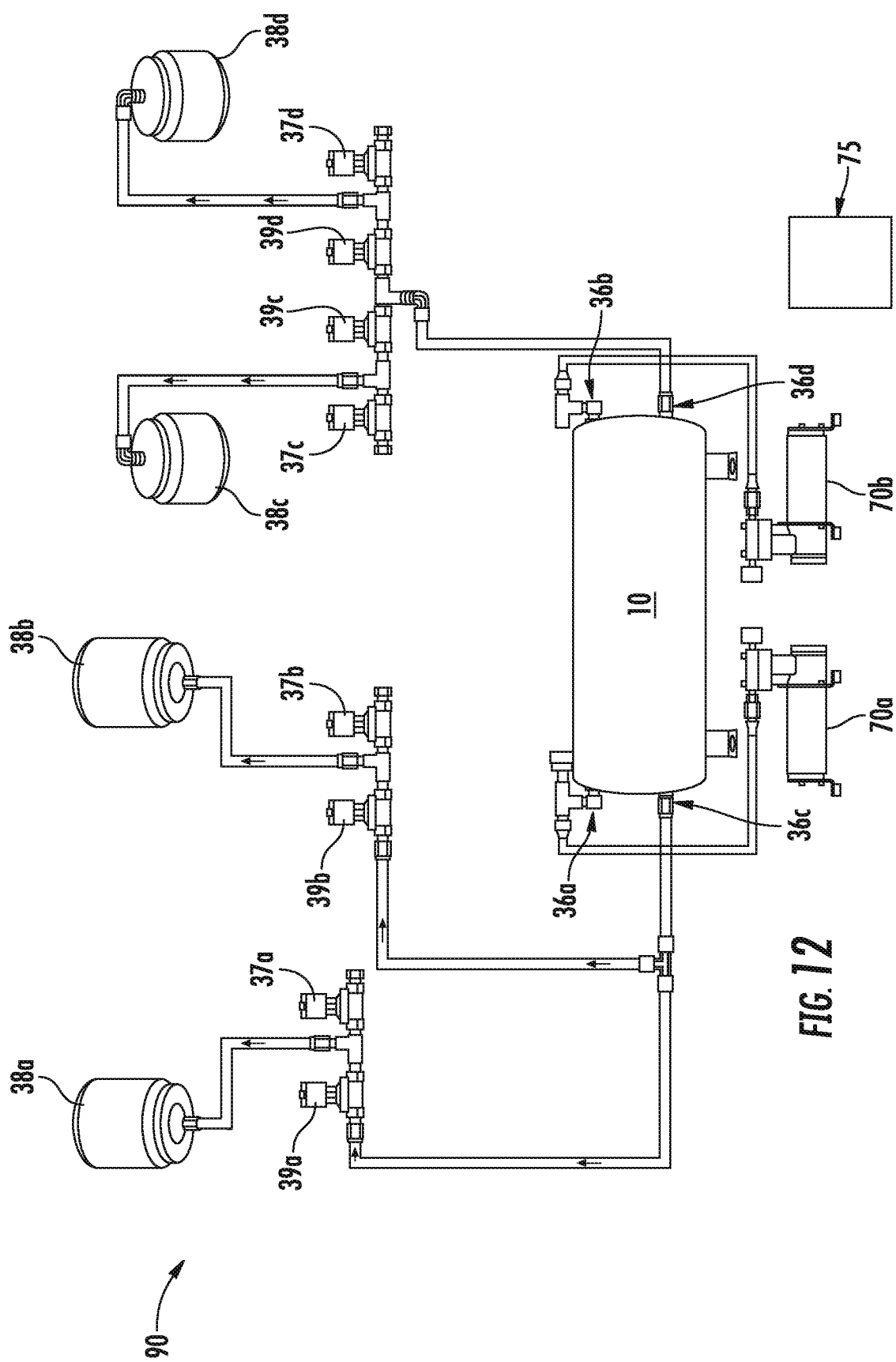
FIG. 12 shows a schematic of an exemplary tank used in an alternative automobile system.

The LEDs 34*a* and 34*b* may be controlled with an electronic controller, such as the controllers 75 in FIGS. 11 and 12, that transmits signals to an LED to activate or deactivate. When activated, the LEDs 34*a* and 34*b* may illuminate tube 12 with the color of the LED. An LED may have RGB (red, green, and blue) colors so that, depending on the combination and intensity of the RGB colors, the controller may create any color desired by the user. An LED may also be a mono-color LED. The lights from the LED may be configured to blink randomly, blink in a pattern, stay on continuously, turn on via a trigger, such as a distal sensor (not shown) communicatively coupled to the LED or a controller of the LED. For example, a sensor that detects whether a trunk of a car is opened may transmit a signal to the LED or a controller of the LED when the trunk of the car is opened, causing the ring LED to blink in a specified color and/or pattern. Preferably, the electronic controller controls each of the ring LEDs 34*a* and 34*b*, independently from the other, for example, transmitting an instruction to the ring LED 34*a* to blink a red color while the ring LED 34*b* stays on continuously with a blue color.

Referring now to FIGS. 7-10, the end cap 13*d* (see FIG. 10) may have two fluid ports 28*p* and 28*q*, as opposed to the five fluid ports 28*g-l* of the end cap 13*b*. The fluid ports 28*p* and 28*q*, may be configured to be in a fluid-tight connection with the fluid ports 42*p* and 42*q*, respectively, when the end cap 13*d* is coupled to the open end of the translucent tube 12. This fluid connection allows fluid to flow through the manifold 40*b* at a 90-degree bend via the fluid ports 42*c* and 42*d* and the fluid ports 28*p* and 28*q*, respectively. The end cap 13*c* may be similarly configured to allow fluid to flow through the fluid ports 42*a* and 42*b* of FIG. 7.

Figure 9:
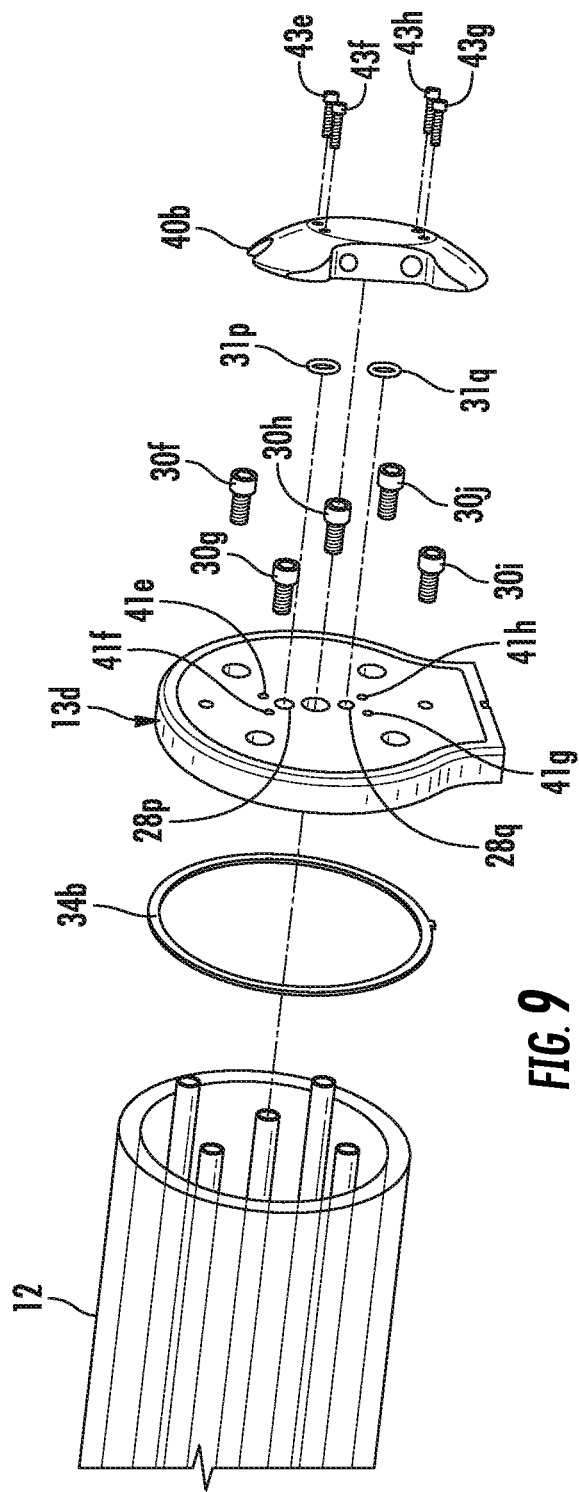
FIG. 9 shows an exploded, perspective view of the translucent tank of FIG. 7.
Figure 10:
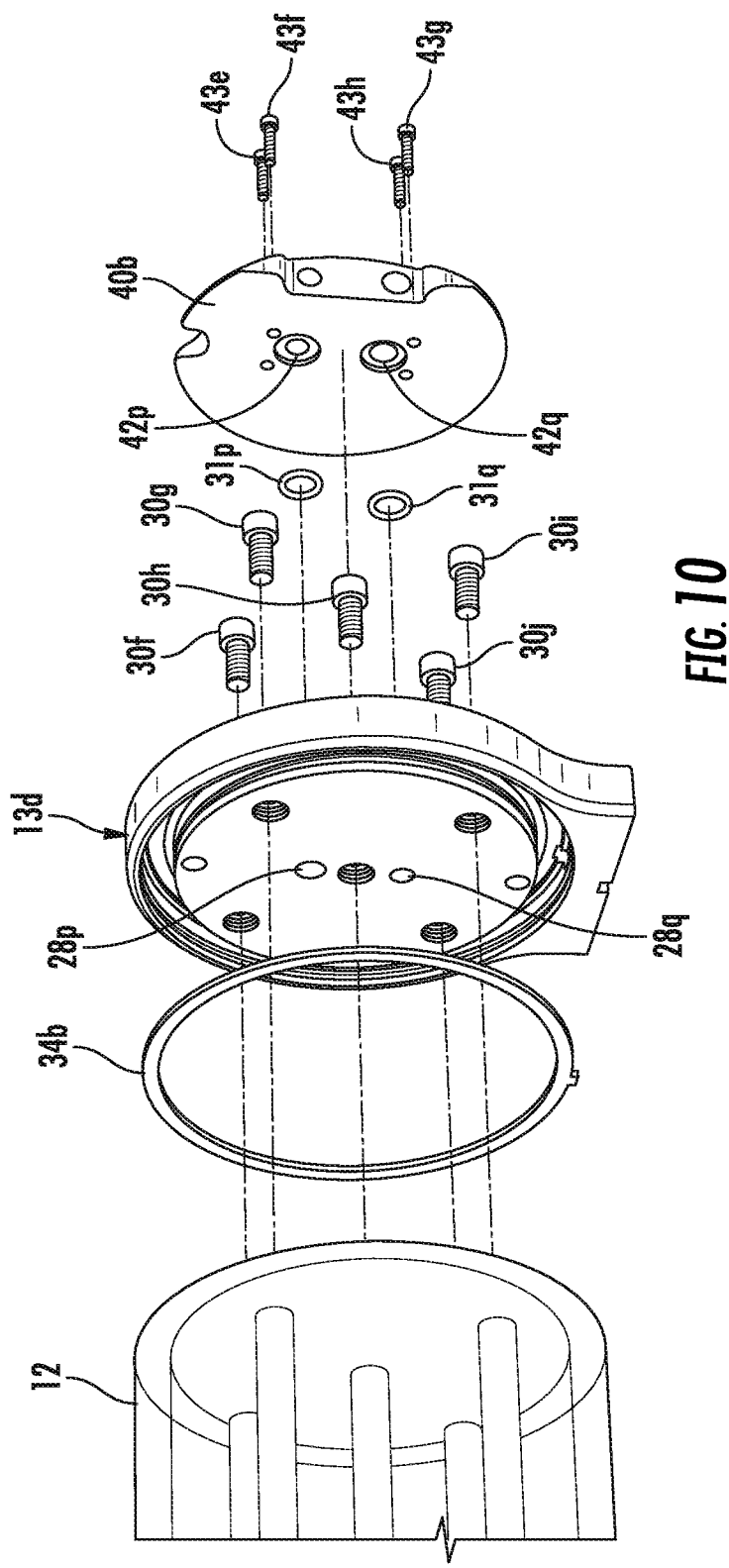
FIG. 10 shows an alternative, exploded perspective view of the translucent tank of FIG. 7.

As shown in FIGS. 9-10, the manifold 40*b* may be connected to the end cap 13*d* using the screws 43*e-h*. The screws 43*e-h* may be used to couple the manifold 40*b* to the end cap 13*d* to maintain the fluid connection between the openings 42*p* and 42*q* of the manifold 40*b* and the ports 28*p* and 28*q* of the end cap 13*d*. The screws 43*e-h* may be configured to mate with the threaded holes 41*e-h*, respectively. Any suitable connector may be used to maintain the connection other than screws, such as clasps, snap connectors, and elastically matching indents/detents. The seals 31*p* and 31*q* may be configured to rest on the ledges formed in the fluid ports 42*p* and 42*q* shown in FIG. 10. The seals 31*p* and 31*q* may comprise an elastic material that deforms when the screws 43*e-h* are tightened to help maintain a fluid connection between the ports 28*p* and 28*q* of the end cap 13*d* and the ports 42*p* and 42*q* of the manifold 40*b*. By using threaded connectors to couple the manifold 40*b* to the end cap 13*d* and threaded connectors to couple the end cap 13*d* to the end cap 13*c*, tank 60 may be easily maintained by removing the threaded connectors for maintenance. The end cap 13*c* may be similarly configured, couple with the manifold 40*a* using the connectors 44*a*-44*d*.

In some embodiments, the fluid ports 42*p* and 42*q* may be configured to comprise one-way valves that do not allow fluid to flow in an opposing direction. For example, the fluid port 42*p* may be configured to strictly allow fluid to flow into tank 60, while the fluid port 42*q* may be configured to strictly allow fluid to flow out of tank 60. The manifold 40*a* may be configured to have two one-way valves that strictly allow fluid to flow into tank 60, while the manifold 40*b* may be configured to have two valves that are both one-way valves that strictly allow fluid to flow out of the tank 60, or both of the manifolds 40a, 40b may be identical to and may have two valves, one of which strictly allows fluid to flow into the tank 60 and the other of which strictly allows fluid to flow out of the tank 60.

Each of the manifolds 40a and 40b, may be configured to be made from a material different from the end caps 13c and 13d, which they may be coupled to, respectively. For example, the manifold 40a may be made from an elastic rubber material, while the end cap 13c may be made from a stiff plastic material. The manifolds 40a and 40b may comprise output ports that may be configured to mate with fluid connectors to distal devices. For example, the port 42a of the end cap 40a may be configured to mate with a pipe or a tube by elastically expanding when a fluid connector is inserted into the port 42a. An elastic port of a manifold may also comprise an indent that matches a detent in the fluid connector (not shown) to assist in maintaining the fluid connection.

Referring now to FIG. 11, a system 80 for a vehicle uses the tank 60 that may be configured to provide air to various air springs 38a, 38b, 38c, and 38d of the vehicle. Tank 60 may be pressurized with a pump 70 connected to one or more of the input ports 65a and 65b of the tank 60 to provide pressurized air to tank 60. Here, pump 70 is shown as fluidly coupled to the input port 65a of tank 60. When pressurized, tank 60 may provide pressurized air that may be delivered via the fluid couplings 66a and 66b to a distal device. Here, the fluid coupling 66a may be fluidly connected to a valve 68a, which controls air output to the air springs 38a and 38b, while the fluid coupling 66b may be fluidly connected to a valve 68b, which controls air output to the air springs 38c and 38d.

An electronic controller 75 may be provided to individually control each of the valves 67a, 67b, 68a, and 68b in addition to the LEDs of the tank 60. Controller 75 may open the valve 68a and close the valve 67a to raise the gas shocks 38a and 38b, or may open the valve 67a and close the valve 68a to lower the gas shocks 38a and 38b. Controller 75 may also open valve 68b and close the valve 67b to raise the gas shocks 38c and 38d, or may open the valve 67b and close the valve 68b to lower the gas shocks 38c and 38d. While the electronic controller 75 is shown as configured to wirelessly transmit control signals to each of the valves 67a, 67b, 68a, and 68b, and to transmit control signals to the LED 34b using a wired connection, the electronic controller 75 may be configured to transmit control signals using either wired or wireless connections.

Referring now to FIG. 12, tank 10 may be pressurized with pumps 70a and 70b, which may be both configured to maintain an air pressure to tank 10 when activated. Tank 10 has output ports that may be fluidly coupled to each of the gas shocks 38a-d via the valves 39a-d, respectively, allowing for the controller 75 to discretely control the height of each of the gas shocks 38a-d. A wireless controller 75 may be used to control the LEDs of tank 10 in addition to the valves 39a-d and 37a-d. To raise the gas shock 38a, controller 75 may transmit a signal to open the valve 39a and close the valve 37a. To lower the gas shock 38a, controller 75 may transmit a signal to close the valve 39a and to open the valve 37a. To maintain the height of the gas shock 38a, controller 75 may transmit a signal to close both of the valves 39a and 37a. Similar signals may be transmitted to the valves 39b-d and 37b-d, to raise, lower, or maintain the heights of each of the gas shocks 38b-d, respectively. One-way valves installed in the fluid lines that lead to tank 10 from the pumps 70a and 70b may be used to ensure that air backflow does not pollute the pumps 70a and 70b from tank 10.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tank mountable to a vehicle, the tank capable of storing compressible gas for raising the vehicle with air springs, the tank comprising:
   first and second end caps having ports which are in fluid communication with a pump to fill the tank with the compressible gas and to air springs to raise the vehicle;
   a translucent tube disposed between the first and second end caps;
   first and second seals disposed between opposed end portions of the tube and the respective first and second end caps for forming a gas tight seal between the first and second end caps and the tube;
   a light emitting diode disposed between the first end cap and the tube to illuminate the tube; and
   a power supply connected to the light emitting diode for providing power to the light emitting diode.

2. The tank of claim 1, further comprising one or more connecting rods coupled to the first and second end caps, the connecting rod disposed inside the tube.

3. The tank of claim 2, further comprising a first o-ring disposed between a first connecting rod and the first end cap and a second o-ring disposed between a second connecting rod and the second end cap for forming a fluid tight seal between the first connecting rod and the first and second end caps.

4. The tank of claim 1, wherein the first end cap comprises a groove that receives an end portion of the tube, an inner radius of the groove being less than an inner diameter of the tube, the tank further comprising an elastic seal disposed within the groove to form a gas tight seal between the tube and the first end cap.

5. The tank of claim 1, wherein the first end cap comprises an input port configured to connect to the pump for allowing the tank to fill with pressurized fluid.

6. The tank of claim 1, wherein the light emitting diode has one or more of primary colors.

7. A method for lighting up a tank mountable to a vehicle, the tank capable of storing compressible gas for raising the vehicle with air springs, the method comprising the steps of:
   connecting a power supply of the tank to a power source on the vehicle;
   pumping gas into the tank with a pump, the pump being in fluid communication with the tank;
   turning on a light emitting diode disposed between a tube of the tank and an end cap of the tank so that light from the light emitting diode is projected into a translucent tube of tank to light up the tube.

8. The method of claim 7 further comprising a step of emitting a color from the light emitting diode to light up the tube with the color.

9. The method of claim 7 wherein during the turning on step, the light is projected through an entire length of the tube.

10. A method of assembling a tank mountable to a vehicle, the tank capable of storing compressible gas for raising the vehicle with air springs, the method comprising the steps of:
- disposing a light emitting diode between a first end cap and a first end portion of a translucent tube;
- forming a first airtight seal between the first end cap and the first end portion of the tube;
- forming a second airtight seal between a second end cap and a second end portion of the tube;
- inserting a connecting rod inside the tube and between the first and second end caps;
- providing a power supply to the light emitting diode for turning on the light emitting diode to illuminate the tube.

11. The method of claim 10, wherein the step of forming the first airtight seal comprises:
- disposing a first elastic seal between a groove in the first end cap and an inner wall of the first end portion of the translucent tube.

12. The method of claim 10, further comprising:
- threading a first threaded connector through the first end cap into a threaded hole formed in a first end of the connecting rod;
- threading a second threaded connector through the second end cap into a threaded hole formed in a second end of the connecting rod;
- tightening the first and second threaded connectors to squeeze the tube between the first and second end caps.

13. The method of claim 12, further comprising:
- coupling an input manifold end cap to the first end cap to receive a fluid that fills the tank; and
- coupling an output manifold end cap to the second end cap to expel a pressurized fluid within the tank.

14. The method of claim 12, further comprising passing a power supply cable through an opening of the first end cap to provide power to the light emitting diode.

* * * * *